(Model.)

J. G. THOMPSON.
Nut-Lock.

No. 227,663. Patented May 18, 1880.

Attest
J. Walter Fowler,
R. K. Evans

Inventor;
Jesse G. Thompson
by A. H. Evans & Co
Attys

UNITED STATES PATENT OFFICE.

JESSE G. THOMPSON, OF CLARION, PENNSYLVANIA.

NUT-LOCK.

SPECIFICATION forming part of Letters Patent No. 227,663, dated May 18, 1880.

Application filed March 2, 1880. (Model.)

*To all whom it may concern:*

Be it known that I, JESSE G. THOMPSON, of Clarion, Clarion county, Pennsylvania, have invented certain new and useful Improvements in Nut-Locks; and I hereby declare the following to be a clear, full, and exact description thereof, reference being had to the accompanying drawings, making a part of this specification, and in which—

Figure 1:
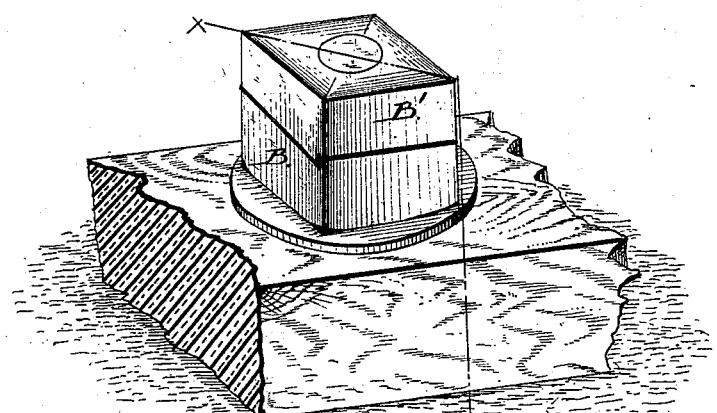
Figure 2:
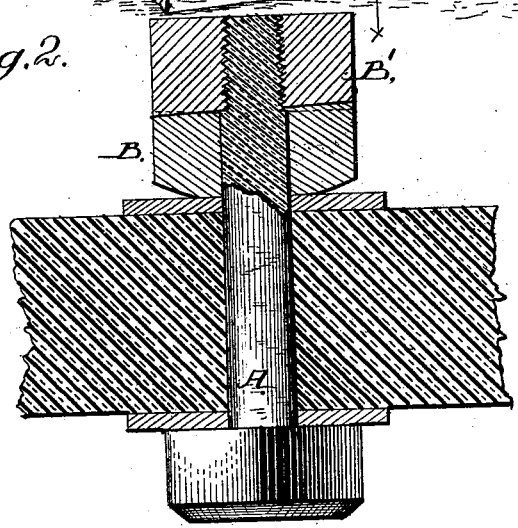
Figure 3:
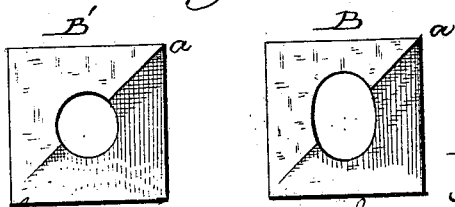

Figure 1 is a perspective view of a bolt with my improved nut-lock applied. Fig. 2 is a section of the same through the line $x\ x$. Fig. 3 shows the construction of the connecting-faces of the two nuts.

My invention relates to that class of nut-locks for use in the construction of railroads, bridges, and other buildings where there is a constant jarring calculated to loosen the nut; and it consists in the combination of devices hereinafter described and claimed.

To enable others skilled in the art to make and use my invention, I will proceed to describe the exact manner in which I have carried it out.

In the drawings, A represents the bolt to be secured, and B B' the two sections of my improved nut-lock. The portion of the bolt which receives section B is made oval or square, or deviating from a circle, and without screw-threads, and the hole through the section B is made to correspond with the bolt, whereby this section, when put in position on the bolt, will not be allowed to turn thereon. The part of the bolt which receives the outer section, B', is screw-threaded, as well as the section itself. That portion of section B next the washer is somewhat rounded, that it may have slight lateral play on the face of the washer. The contiguous faces of the two sections are beveled diagonally over half of each face, as shown in Fig. 3, and when brought together, as shown in Fig. 1, these beveled portions are reversed in position, and then the two faces are permitted to come into close contact, as shown in Fig. 1.

The operation of my invention is as follows: The bolt being in position, the section B of the nut is slipped over the end of the bolt to its position on the oval part of the bolt, and the section B' is next screwed down tightly until the projection $a'$ on the section portion B' passes over and drops beside the projection $a$ on the face of the stationary section.

If the nut be not sufficiently tight, another turn may be given it, as the rounding surface of the portion of stationary section next the washer allows of sufficient spring to pass the two projections by each other and leave the faces of the sections tightly closed, as shown in Fig. 1.

Having described my invention, I claim as new and desire to secure by Letters Patent—

The improved nut-lock constructed as described, consisting of the threaded nut B' and washer B, each beveled diagonally over half of each face, and the washer having a non-circular opening, in combination with the bolt A, having its shank of the shape of the opening in washer B, substantially as described.

JESSE G. THOMPSON.

Attest:
  WM. F. MORSELL,
  JNO. L. CONDRON.